US010172018B2

United States Patent
Khan (10) Patent No.: US 10,172,018 B2
(45) Date of Patent: Jan. 1, 2019

(54) WIRELESS SYSTEMS AND METHODS USING MILLIMETER WAVE BAND SIGNALS WITH ASYMMETRIC DIRECTIVITY

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/662,260

(22) Filed: Jul. 27, 2017

(65) Prior Publication Data

US 2018/0352445 A1 Dec. 6, 2018

Related U.S. Application Data

(60) Provisional application No. 62/516,051, filed on Jun. 6, 2017.

(51) Int. Cl.
| | |
|---|---|
| *H04W 16/28* | (2009.01) |
| *H04B 7/10* | (2017.01) |
| *H04B 7/0404* | (2017.01) |
| *H04W 72/04* | (2009.01) |

(52) U.S. Cl.
CPC .......... *H04W 16/28* (2013.01); *H04B 7/0404* (2013.01); *H04B 7/10* (2013.01); *H04W 72/046* (2013.01); *H04W 72/0446* (2013.01); *H04W 72/0453* (2013.01)

(58) Field of Classification Search
CPC ............... H04W 16/28; H04W 72/046; H04W 72/0453; H04W 72/0446; H04B 7/0404; H04B 7/10
See application file for complete search history.

(56) References Cited

U.S. PATENT DOCUMENTS

| | | | |
|---|---|---|---|
| 2013/0315321 A1* | 11/2013 | Rajagopal | H04L 27/2607 375/260 |
| 2014/0185481 A1* | 7/2014 | Seol | H04W 52/42 370/252 |
| 2015/0325912 A1* | 11/2015 | Liu | H01Q 1/1257 342/368 |
| 2017/0086199 A1* | 3/2017 | Zhang | H04W 24/02 |

* cited by examiner

*Primary Examiner* — Joseph E Dean, Jr.
(74) *Attorney, Agent, or Firm* — Michael A. Rahman (57) ABSTRACT

A wireless communication system uses millimeter wave band asymmetric directivity signals. The system includes a base station configured to transmit in a downlink direction millimeter wave band low directivity signals having a wide beamwidth. The system includes a plurality of communication devices configured to transmit in an uplink direction millimeter wave band high directivity signals having narrow beamwidth. The millimeter wave band high directivity signals are transmitted by the communication devices in different frequency channels. The base station is configured for a wide receive beam and the communication devices are configured for a narrow receive beam.

35 Claims, 10 Drawing Sheets

WIRELESS SYSTEMS AND METHODS USING MILLIMETER WAVE BAND SIGNALS WITH ASYMMETRIC DIRECTIVITY

CROSS-REFERENCE TO RELATED APPLICATION

This application claims priority to U.S. Provisional Patent Application No. 62/516,051, filed Jun. 6, 2017, and entitled "WIRELESS SYSTEM USING ASYMMETRIC DIRECTIVITY" which is hereby incorporated by reference in its entirety.

BACKGROUND

This invention relates to wireless communications, and in particular relates to wireless systems and methods using millimeter wave band signals with asymmetric directivity.

DESCRIPTION OF THE RELATED ART

Current wireless communication systems are based on two popular standards: a wide area network (WAN) standard referred to as The Fourth Generation Long Term Evolution (4G LTE) system; and a local area network (LAN) standard called Wi-Fi. Wi-Fi operates on shared or unlicensed spectrum as short-range wireless extension of wired broadband systems. 4G LTE systems on the other hand provide wide area long-range connectivity using licensed spectrum and dedicated infrastructure such as cell towers and backhaul to connect to the Internet.

As more people connect to the Internet, increasingly chat to friends and family, watch videos, listen to streamed music, and indulge into virtual/augmented reality experiences, data traffic continues to grow at unprecedented rates. In order to address the continuously growing wireless capacity challenge, the next generation LAN and WAN systems are expected to use higher frequencies referred to as millimeter waves spectrum shown in Table 1.

TABLE 1

Examples of millimeter wave bands

| Bands [GHz] | Frequency [GHz] | Bandwidth [GHz] |
|---|---|---|
| 24 GHz | 24.25-24.45 | 0.200 |
|  | 24.75-25.25 | 0.500 |
| 28 GHz/LMDS | 27.5-28.35 | 0.850 |
|  | 29.1-29.25 | 0.150 |
|  | 31-31.3 | 0.300 |
| 32 GHz | 31.8-33 | 1.200 |
| 37 GHz | 37.0-38.6 | 1.600 |
| 39 GHz | 38.6-40 | 1.400 |
| 42 GHz | 42.0-42.5 | 0.500 |
| 47 GHz | 47.2-50.2 | 3.000 |
| 50 GHz | 50.4-52.6 | 1.200 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

SUMMARY OF THE INVENTION

According to disclosed embodiments, a wireless communication system using asymmetric directivity signals includes a base station configured to transmit in a downlink direction millimeter wave band low directivity signals having a wide beamwidth. The system includes a plurality of communication devices configured to transmit in an uplink direction millimeter wave band high directivity signals having narrow beamwidth. The millimeter wave band high directivity signals are transmitted by the communication devices in different frequency channels. The high directivity signals transmitted by the communication devices are received by the base station.

According to disclosed embodiments, a wireless communication device includes a receiver configured to operate at a wideband frequency channel and to receive millimeter wave band signals transmitted by a base station having a wide beamwidth. The communication device includes a transmitter configured to operate at a narrowband frequency channel and to transmit millimeter wave band high directivity signals having narrow beamwidth. The communication device includes an antenna array coupled to the receiver and configured to receive the millimeter wave band signals. The communication device includes an antenna array coupled to the transmitter and configured to transmit the millimeter wave band high directivity signals. The communication device includes a processor coupled to the transmitter and the receiver and configured to process the signals.

According to disclosed embodiments, a radio base station includes a receiver configured to operate at a narrowband frequency channel and to receive millimeter wave band high directivity signals having a narrow beamwidth. The radio base station includes a transmitter configured to operate at a wideband frequency channel and to transmit millimeter wave band low directivity signals having wide beamwidth. The radio base station includes an antenna array coupled to the receiver and configured to receive the millimeter wave band high directivity signals. The radio base station includes an antenna array coupled to the transmitter and configured to transmit the millimeter wave band low directivity signals. The radio base station includes a processor coupled to the transmitter and the receiver and configured to process the signals.

According to disclosed embodiments, a method of communication using asymmetric directivity signals includes transmitting by a radio base station in separate time slots millimeter wave band low directivity signals having a wide beamwidth. The method includes receiving by the radio base station millimeter wave band high directivity signals having narrow beamwidth. The method includes transmitting uplink signals to the radio base station and receiving downlink signals from the radio base station in a same channel. The method includes transmitting uplink signals to the radio base station and receiving downlink signals from the radio base station in different channels.

According to disclosed embodiments, a method of communication using asymmetric directivity signals includes transmitting by at least one communication device millimeter wave band high directivity signals having a narrow beamwidth. The method includes receiving, by the communication device, millimeter wave band signals. The method includes transmitting the high directivity signals by a plurality of communication devices in respective frequency channels.

DETAILED DESCRIPTION

Figure 1:
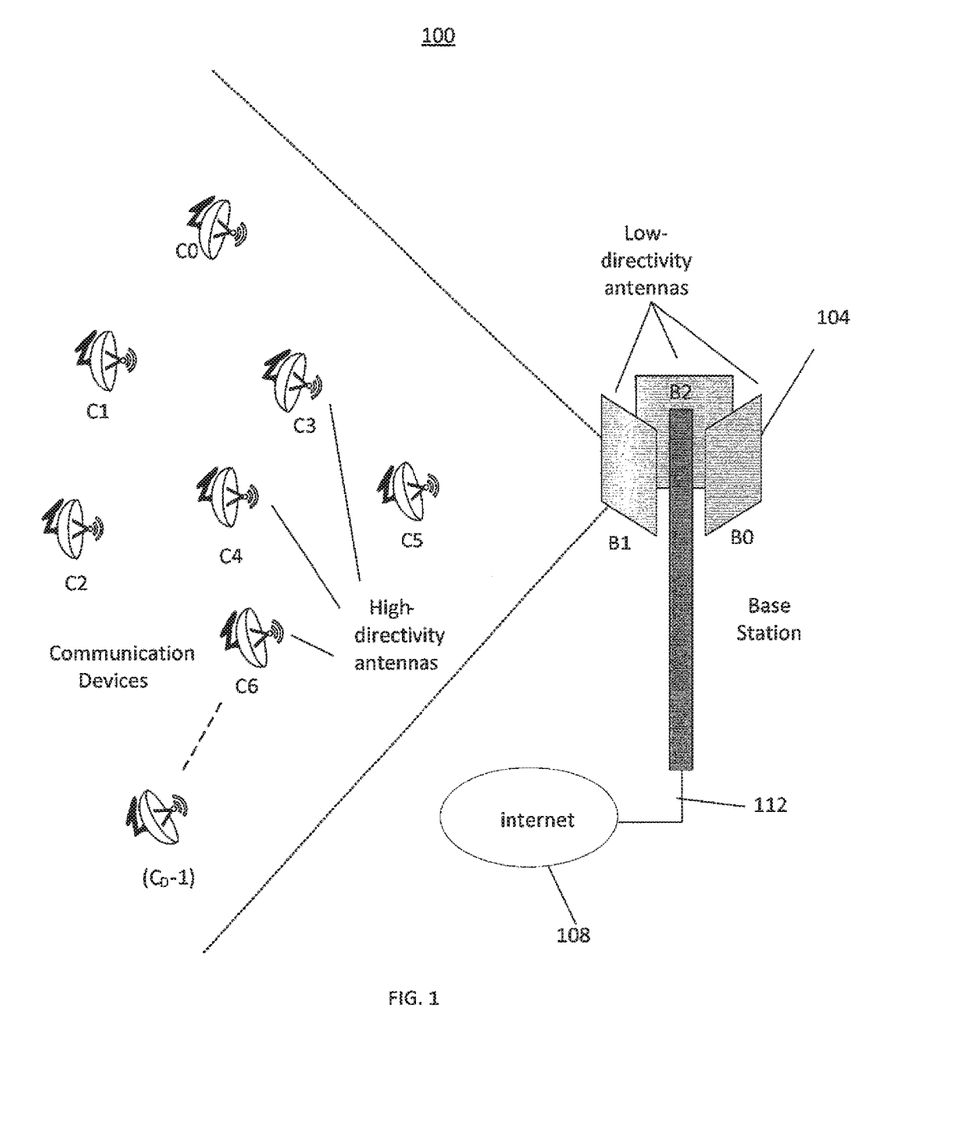
FIGS. 1-3 illustrate wireless communications systems in accordance with disclosed embodiments.

FIG. 1 illustrates a wireless communications system 100 in accordance with disclosed embodiments. The wireless communications system 100 includes a radio base station or access point 104 comprising sectors B0, B1 and B2. Although the radio base station or access point 104 is shown with only three sectors (B0, B1, and B2), the base station 104 may include only one sector or may include more than three sectors. The base station or access point 104 is connected to the Internet 108 or any other communications network via a wired link 112 such as a fiber optic link.

According to some disclosed embodiments, the base station 104 uses millimeter wave band low directivity beams for wider coverage to communicate with a plurality of communication devices. For example, the sector B1 transmits millimeter wave band low directivity beams to communicate with communication devices $C_0, C_1, \ldots, (C_D-1)$. The communication devices $C_0, C_1, \ldots, (C_D-1)$ transmit millimeter wave band highly directive beams to communicate with the base station 104. Thus, the base station 104 transmits low directivity wide beams for wider coverage to communicate with multiple communication devices $C_0, C_1, \ldots, (C_D-1)$, while the communication devices $C_0, C_1, \ldots, (C_D-1)$ transmit high directivity narrow beams to communicate with the base station 104. The communication devices use a narrow receive beam to receive the millimeter wave signals transmitted by the base station 104. The communication device may be a fixed wireless access customer premise equipment (CPE) device, mobile phone, a laptop computer, a desktop computer, a virtual reality or augmented reality device or any other mobile communication device.

Figure 2:
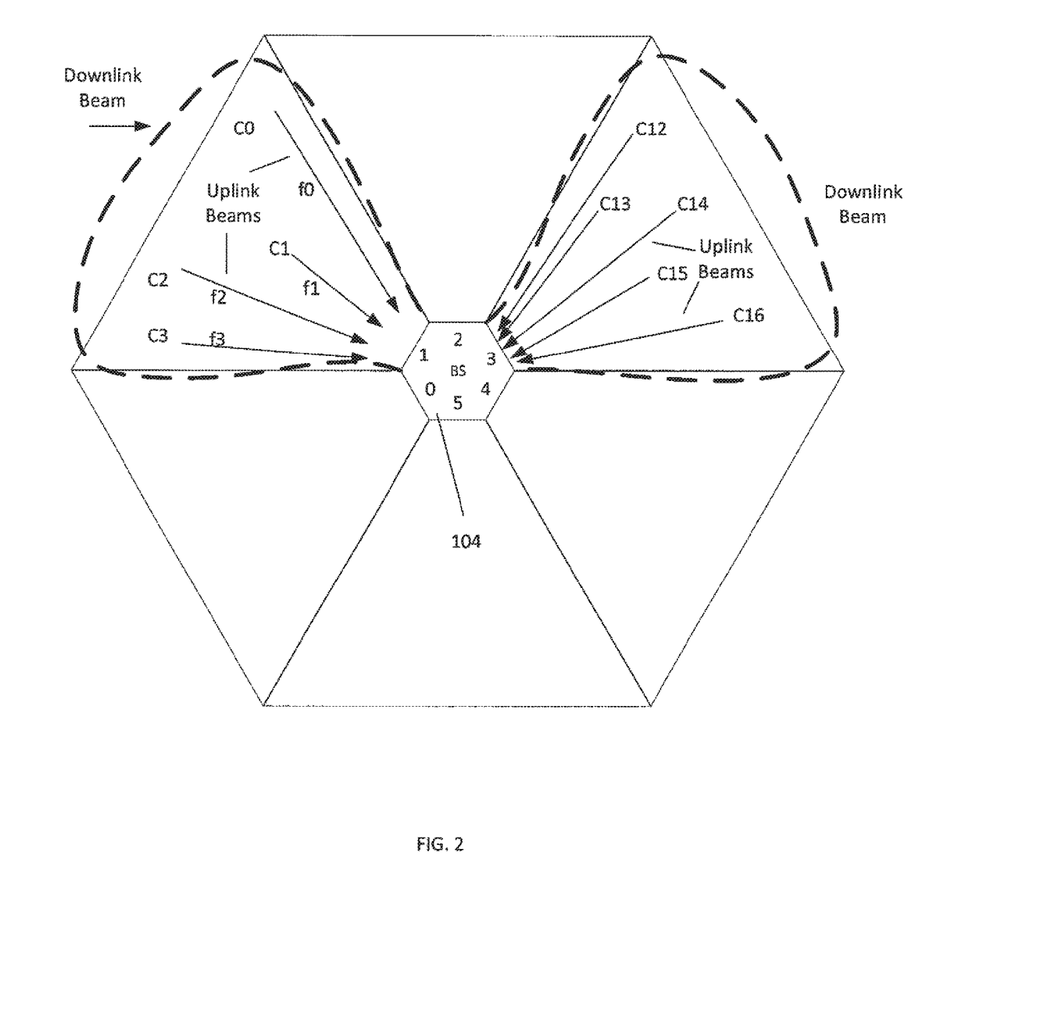

FIG. 2 illustrates an exemplary wireless system 200 in accordance with some disclosed embodiments. As shown in FIG. 2, the base station 104 uses low directivity beams for wider coverage in the downlink direction. The communication devices C0, C1, C2 and C3 use highly directive beams towards the base station 104 in the uplink direction. In the exemplary embodiment shown in FIG. 2, the base station 104 creates six beams of 60 degrees each to provide 360 degrees coverage in the downlink direction. For illustration purposes, Beams 1 and 3 are shown in dashed lines. In each beam, the base station 104 serves multiple communication devices. For example, in Beam 1, the base station 104 serves four communication devices C0-C3. In Beam 3, the base station 104 serves five communication devices C12-C16. According to some disclosed embodiments, the signal transmission to the communication devices may be separated in frequency using different frequency channels or in time using different time slots.

In the uplink direction, the communication devices use narrow beams with high directivity towards the base station 104. However, due to wider beamwidth of the base station 104's receive antenna, the received signals from different communication devices may interfere with each other. To avoid the interference, the signal transmission from the communication devices may be separated in frequency using different frequency channels. In the example of FIG. 2, the communication devices C0, C1, C2 and C3 transmit signals at frequency channels $f_0, f_1, f_2, f_3$ respectively.

Figure 3:
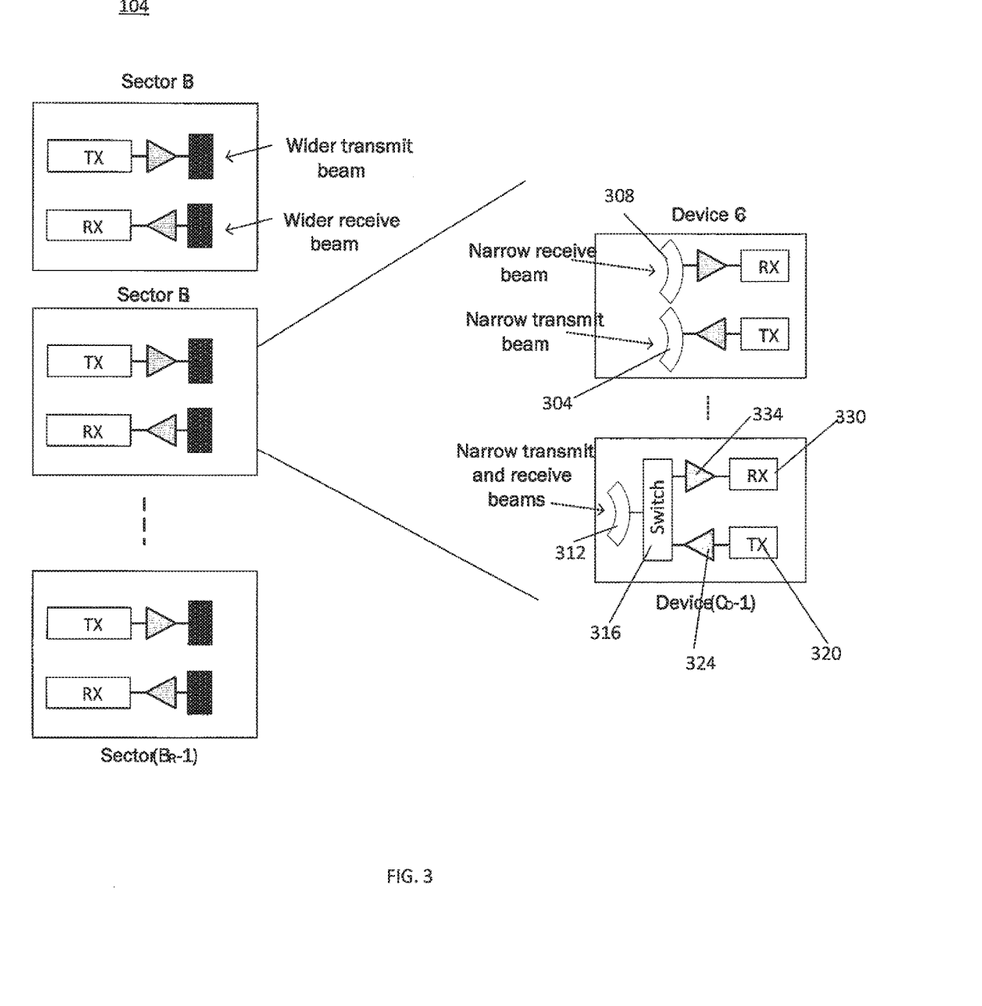

FIG. 3 illustrates the base station 104 using low directivity beams for wider coverage while communication devices using highly directive beams towards the base station. In the exemplary embodiment shown in FIG. 3, the base station 104 comprises $(B_R-1)$ sectors to provide coverage in different directions. Although the base station 104 is shown to include $(B_R-1)$ sectors, the base station 104 may include only one sector or may include any number of sectors.

In order to provide 360-degree coverage, each sector needs to cover $$\frac{360}{(B_R - 1)}$$

degrees. In each sector, the base station 104 serves multiple communication devices. For example, in Sector B1, the base station serves $(C_D-1)$ communication devices numbered $C_0, C_1, \ldots, (C_D-1)$.

According to disclosed embodiments, the base station sectors use wide transmit and receive beams using antenna arrays. The communication devices use narrow receive and transmit beams. The communication devices can form narrow beams by using large antenna array, parabolic dish, horn, lens or other high-directivity antennas. For illustration purposes, FIG. 3 shows a single transmit and receive chain for each of the base station sectors and the devices. However, the principles of the current invention are also applicable to a base station sector having multiple transmit and receive chains and to a communication device having multiple transmit and receive chains such as in Multiple Input Multiple Output (MIMO) systems.

Referring to FIG. 3, the communication device $C_0$ uses separate transmit and receive antennas 304 and 308, respectively, while the communication device $(C_D-1)$ share the transmit and receive antennas 312. Since the communication device $(C_D-1)$ share the transmit and receive antennas 312, a switch 316 connects the transmit chain to the antenna 312 when in transmit mode, and the switch 316 connects the receive chain to the antenna 312 when in receive mode. The transmit chain refers to the chain comprising a transmitter 320 and a power amplifier 324, and the receive chain refers to the chain comprising a receiver 330 and a low noise amplifier 334.

In some embodiments, a radio frequency (RF) duplexer or circulator can be used where the transmit and receive chains need to be active at the same time. Similarly, the base station sectors can share the antennas between transmissions and receptions by using an RF switch for time-division-duplex (TDD) operation or an RF duplexer or circulator for frequency-division-duplex (FDD) operation.

Figure 4:
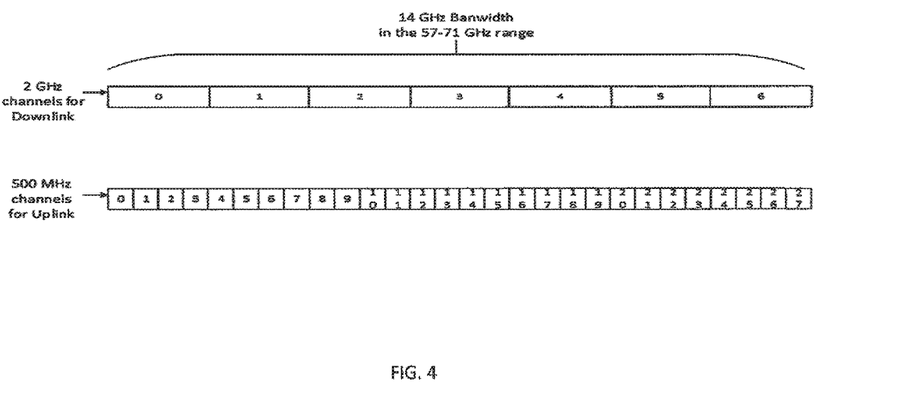
FIG. 4 illustrates channelization in downlink and uplink directions.

FIG. 4 illustrates exemplary channelizations in the downlink and uplink directions according to principles of the current invention. In the downlink direction, 14 GHz of spectrum in the license-exempt 57-71 GHz band is divided into 7 channels of 2 GHz each for transmissions from the base station to the communication devices. In the uplink direction, 14 GHz of spectrum is divided into 28 channels of 500 MHz each for transmissions from the communication devices to the base station.

Figure 5:
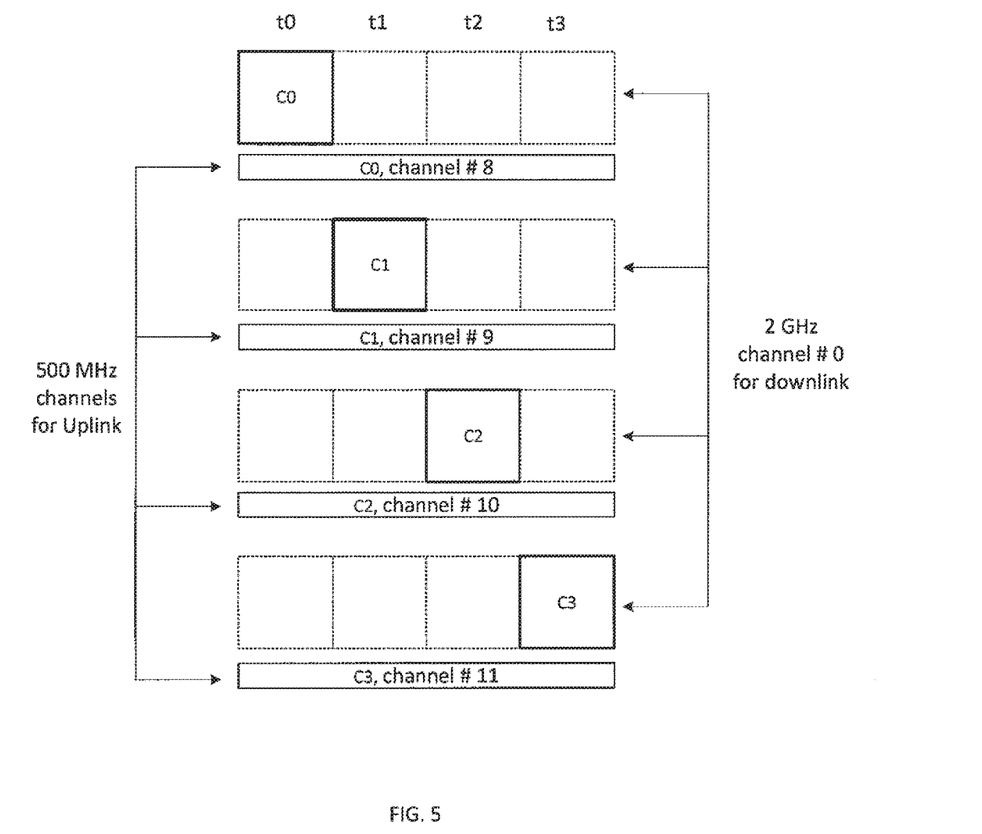
FIG. 5 illustrates downlink and uplink communications.

FIG. 5 illustrates exemplary downlink and uplink communications channels according to the teachings of the current invention. A 2 GHz downlink channel is shared, in separate time slots, between four communication devices C0, C1, C2 and C3 while each of the four communication devices C0, C1, C2 and C3 use a different 500 MHz channel for uplink transmissions. In the downlink, using a relatively wider beamwidth, the base station 104 transmits signals to communication devices C0, C1, C2 and C3 on a 2 GHz wide channel number 0 in time slots t0, t1, t2 and t3 respectively. In the uplink, using a relatively narrow beamwidth, communication devices C0, C1, C2 and C3 transmit signals using 500 MHz wide channel number 8, 9, 10 and 11 respectively. The 500 MHz wide channel numbers 8, 9, 10 and 11 correspond to 2 GHz channel 3 as shown in FIG. 4. Thus, the communication devices can transmit signals on the uplink while receiving downlink signals as the uplink and downlink channels are on different frequencies and do not interfere with each other.

Figure 6:
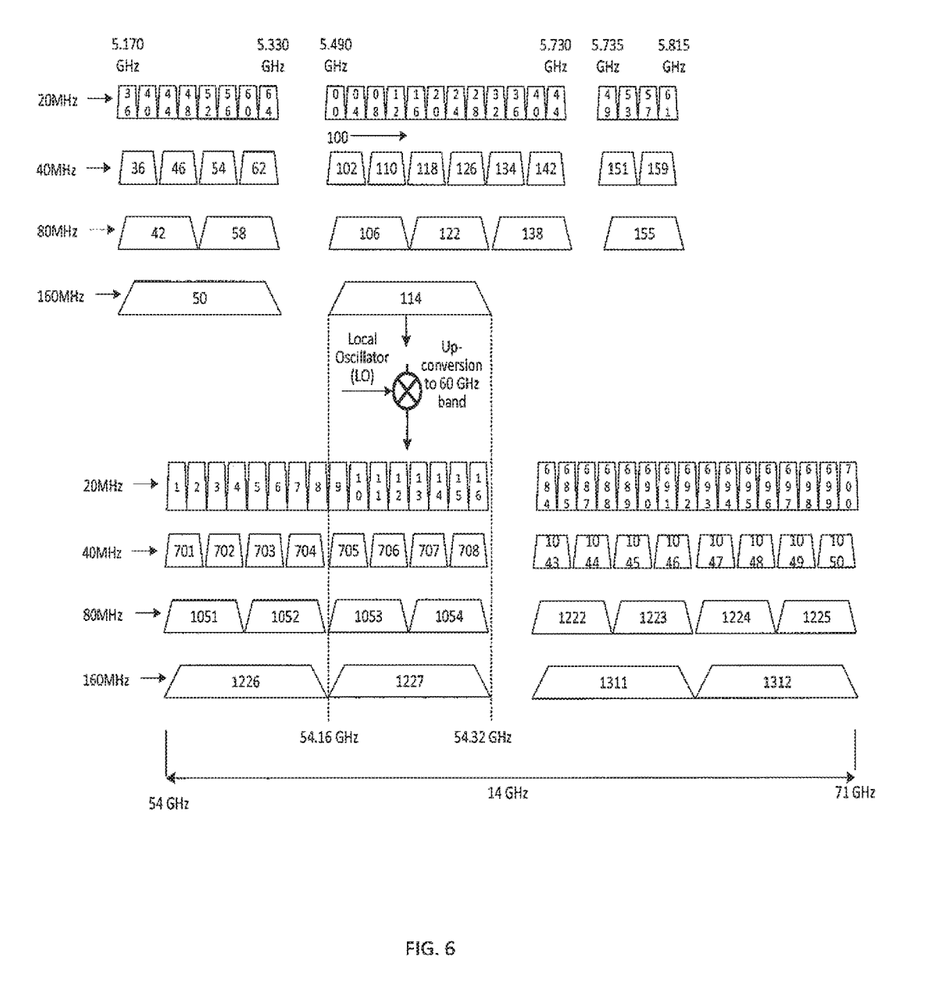
FIG. 6 illustrates up-conversion of signals.

FIG. 6 illustrates up-conversion of IEEE 802.11ac or 802.11ax signals to the 60 GHz band according to the teachings of the current invention. The IEEE 802.11ac and 802.11ax standards support channel bandwidths of 20 MHz, 40 MHz, 80 MHz and 160 MHz in the 5 GHz spectrum. For example, 160 MHz channel number 50 and channel number 114 cover frequency range of 5.17-5.33 GHz and 5.49-5.65 GHz respectively. 40 MHz channel number 151 and 80 MHz channel number 155 cover frequency range of 5.735-5.775 GHz 5.735-5.815 GHz respectively.

Referring to FIG. 6, 14 GHz of spectrum in the 54 GHz and 71 GHz range is divided into 700 channels of 20 MHz each; channel number 1 to channel number 700. These 700 channels can be grouped into 350 channels of 40 MHz; channel number 701 to channel number 1050, 175 channels of 80 MHz; channel number 1051 to channel number 1225, or 87 channels of 160 MHz each; channel number 1226 to channel number 1312. A mix of 20 MHz, 40 MHz, 80 MHz and 160 MHz channels can be used for communication between the base station 104 and the communication devices. For example, a system may use 55 channels of 160 MHz, 31 channels of 80 MHz, 36 channels of 40 MHz and 64 channels of 20 MHz to fully utilize the 14 GHz bandwidth.

In the example of FIG. 6, 160 MHz channel number 1227 in the 60 GHz spectrum band covers frequency in the 54.16-54.32 GHz range. 160 MHz channel number 114 covering frequency range of 5.49-5.65 GHz in the 5 GHz spectrum is up-converted to 160 MHz channel number 1227 in the 60 GHz spectrum band. A local oscillator frequency of 48.67 GHz can be used to perform this up-conversion from the 160 MHz channel number 114 in 5 GHz spectrum block to 160 MHz channel number 1227 in the 60 GHz spectrum band. In other embodiments, IEEE 802.11ac or 802.11ax baseband signals can be directly up-converted to the 60 GHz band using a higher local oscillator frequency.

Since the bandwidth in the 60 GHz spectrum band is much larger than the bandwidth in the 5 GHz spectrum, same channel in the 5 GHz spectrum can be up-converted to multiple channels in the 60 GHz spectrum block. For example, using a local oscillator frequency of 48.83 GHz, 160 MHz channel number 114 covering frequency range of 5.49-5.65 GHz in the 5 GHz spectrum band is up-converted to 160 MHz channel number 1228 in the 60 GHz spectrum band covering frequency in the 54.32-54.48 GHz range. Similarly, other channels of 160 MHz and 20, 40 or 80 MHz in the 5 GHz spectrum can be up-converted to channels in the 60 GHz spectrum block.

Figure 7:
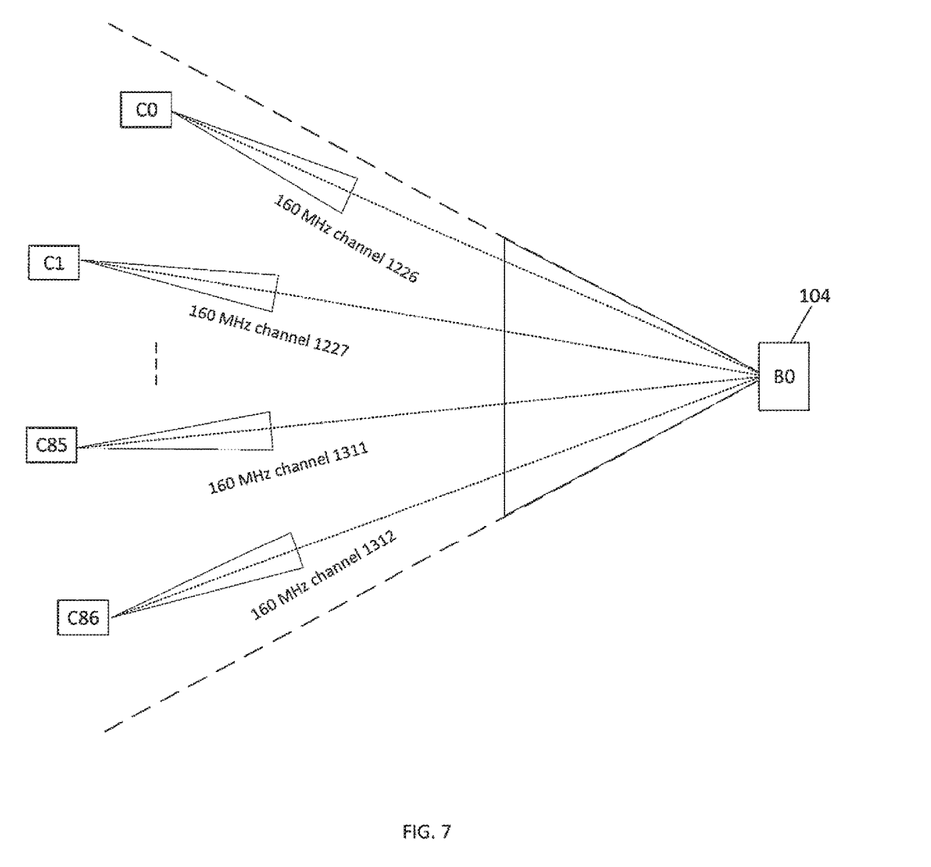
FIG. 7 illustrates a wireless communication system according to other embodiments.

FIG. 7 illustrates a wireless base station sector B0 of the base station 104 using low directivity beams for wider coverage communicating with wireless devices, $C_0$-$C_{86}$, that use highly directive beams. The communication between the base station 104 and a communication device use a different 160 MHz channel in the 60 GHz band. The communication devices $C_0$-$C_{86}$ use 160 MHz channel number 1226 through channel number 1213 respectively. In this example, same channel is used for the uplink and downlink using a time-division-duplex (TDD) approach. For example, the communication device C85 use 160 MHz channel number 1311 for both the uplink and the downlink.

Since the wireless communication devices $C_0$-$C_{86}$ are pointing their receive and transmit beams towards the base station sector $B_0$, the uplink transmissions from all the devices are received at the base station sector B0. Similarly, all the downlink transmissions from the base station sector $B_0$ are received at the communication devices. However, communication link between the base station sector $B_0$ and each of the communication devices use different frequency channel avoiding interference between the signals of different communication devices.

Figure 8:
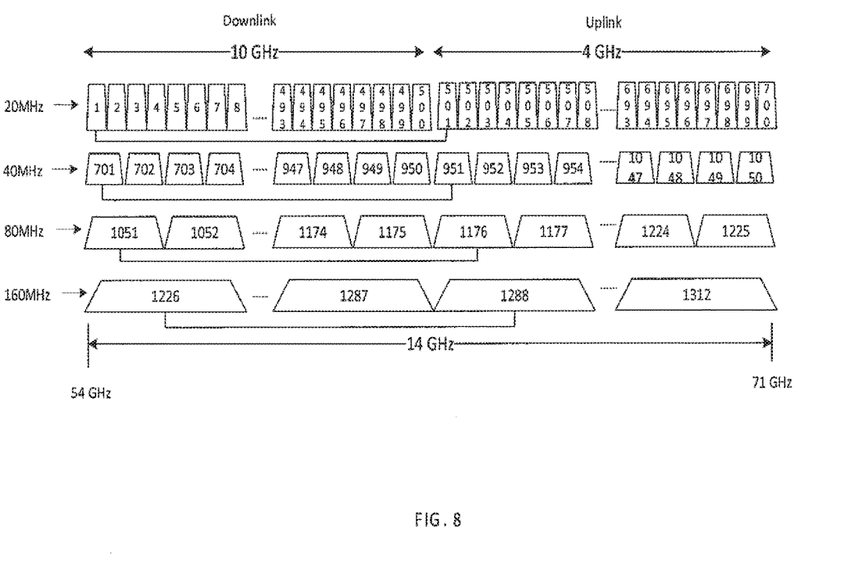
FIG. 8 illustrates segmentation of the 14 GHz of spectrum in the 60 GHz spectrum band.

FIG. 8 illustrates segmentation of the 14 GHz of spectrum in the 60 GHz spectrum band between the downlink and uplink. 10 GHz of the 14 GHz spectrum is allocated for downlink while the remaining 4 GHz is allocated for uplink communication. In the uplink, the transmit power from the communication devices is generally lower compared to the base station. The allocation of the later part of the spectrum, that is 67-71 GHz where oxygen absorption losses are smaller for the uplink allows communication devices to transmit at lower power.

A 10 GHz separation between the downlink and uplink transmissions eliminate the need for expensive filters or duplexers at the base station 104 and the communications devices to avoid the interference between the downlink and uplink. A mapping that provides 10 GHz separation between the downlink and uplink channels is shown in FIG. 8. 20 MHz channel number 1 in the downlink is mapped to 20 MHz channel number 501 in the uplink, 20 MHz channel number 2 in the downlink is mapped to 20 MHz channel number 502 in the uplink and so on. 40 MHz channel number 701 in the downlink is mapped to 40 MHz channel number 951 in the uplink, 40 MHz channel number 702 in the downlink is mapped to 40 MHz channel number 952 in the uplink and so on. 80 MHz channel number 1051 in the downlink is mapped to 80 MHz channel number 1176 in the uplink, 80 MHz channel number 1052 in the downlink is mapped to 80 MHz channel number 1177 in the uplink and so on. 160 MHz channel number 1226 in the downlink is mapped to 160 MHz channel number 1288 in the uplink, 160 MHz channel number 1227 in the downlink is mapped to 160 MHz channel number 1289 in the uplink and so on.

Figure 9:
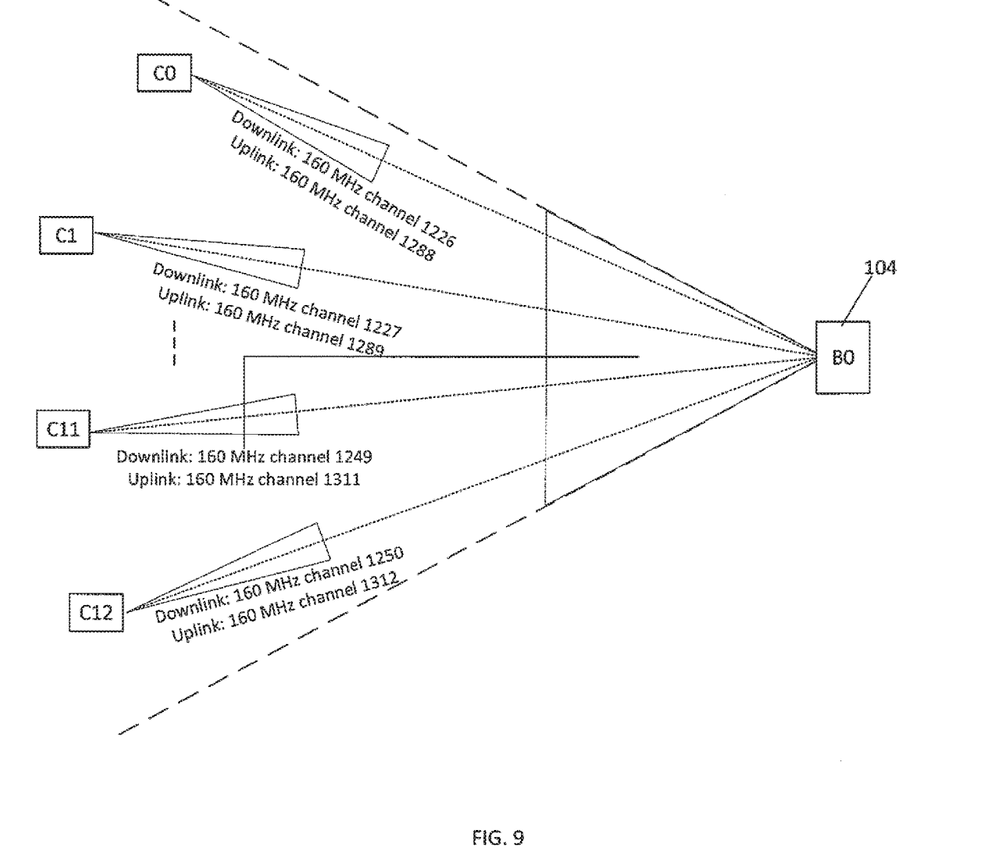
FIGS. 9-10 illustrate wireless communication systems according to other disclosed embodiments.

FIG. 9 illustrates the base station sector $B_0$ of the base station 104 using low directivity beam and the communications devices, $C_0$-$C_{12}$, using high directivity beams where different 160 MHz channels are used for the downlink and uplink communication. The communications devices C0, C1, C11 and C12 use 160 MHz channel number 1226, 1227, 1249 and 1250 respectively for the downlink. The communications devices C0, C1, C11 and C12 use 160 MHz channel number 1288, 1289, 1311 and 1312 respectively for the uplink.

Figure 10:
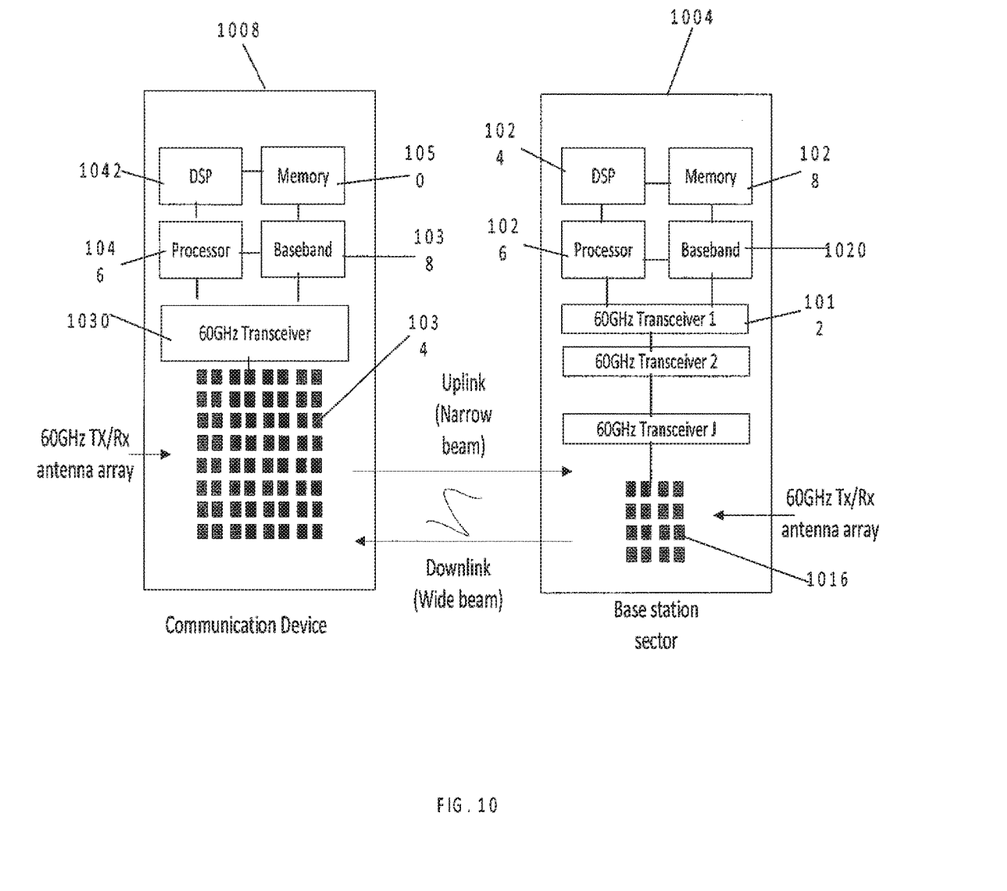

FIG. 10 illustrates an exemplary base station 1004 and a communication device 1008 according to some disclosed embodiments. The base station 1004 includes multiple transceivers 1012 (e.g., 60 GHz transceivers) to support multiple simultaneous channels, a 60 GHz antenna array 1016, a baseband processor 1020, a digital signal processor 1024, CPU 1026 and a memory 1028. The communication device 1008 includes a transceiver 1030 (e.g., 60 GHz transceiver), a 60 GHz antenna array 1034, a baseband processor 1038, a digital signal processor 1042, a CPU 1046, and a memory 1050.

The communication device 1008 generally operates on a single channel while the base station 1004 (or a base station sector) needs to support multiple simultaneous channels for communication with multiple communication devices. The base station 1004 implements at least one antenna array with a beam width that is wider compared to the beam width of the communication device's antenna array. Accordingly, the size of the antenna array or the antenna aperture size at the base station 1004 is smaller compared to the antenna array or the antenna aperture size at the communication device 1008. A larger antenna array or the antenna aperture size allows the communication device 1008 to transmit and receive signals with higher directivity or narrower beams with small beam width. The communication device 1008 can implement smaller beam widths or narrow beams by using other techniques such as use of a Horn antenna or a Cassegrain parabolic antenna.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A wireless communication system using asymmetric directivity signals, comprising:
   a base station configured to transmit millimeter wave band low directivity downlink signals having a wide beamwidth in separate time slots in a shared frequency channel;
   a plurality of communication devices configured to receive the millimeter wave band low directivity downlink signals in the shared frequency channel;
   the plurality of communication devices each configured to transmit millimeter wave band high directivity uplink signals having narrow beamwidth in different respective frequency channels,
   the base station configured to receive the millimeter wave band high directivity uplink signals having narrow beamwidth in the respective frequency channels.

2. The wireless communication system of claim 1, wherein the base station transmits a first low directivity signal in a first time slot.

3. The wireless communication system of claim 1, wherein the base station transmits a second low directivity signal in a second time slot and a third low directivity signal in a third time slot.

4. The wireless communication system of claim 1, wherein a first communication device transmits a first millimeter wave band high directivity signal on a first frequency channel.

5. The wireless communication system of claim 1, wherein a second communication device transmits a second millimeter wave band high directivity signal on a second frequency channel and the third communication device transmits a second millimeter wave band high directivity signal on a third frequency channel.

6. The wireless communication system of claim 1, wherein the communication device receives downlink signals and transmits uplink signals over the same channel.

7. The wireless communication system of claim 1, wherein the communication device receives downlink signals and transmits uplink signals over different channels.

8. The wireless communication system of claim 1, wherein base station and communication devices transmit and receive millimeter wave band signals in the 60 GHz spectrum band.

9. The wireless communication system of claim 1, wherein the communication device receives the downlink signals transmitted by the base station by using a narrow receive beam.

10. The wireless communication system of claim 1, wherein the communication device is a fixed wireless access customer premise equipment (CPE) device.

11. The wireless communication system of claim 1, wherein the communication device is a mobile phone.

12. The wireless communication system of claim 1, wherein the communication device is a computer.

13. The wireless communication system of claim 1, wherein the communication device is an augmented reality/virtual reality (AR/VR) device.

14. The wireless communication system of claim 1, wherein the base station includes an antenna array configured to transmit millimeter wave band low directivity signals.

15. The wireless communication system of claim 1, wherein the base station includes an antenna array configured for a wide receive beam.

16. The wireless communication system of claim 1, wherein the communication devices include an antenna array configured to transmit millimeter wave band high directivity signal having a narrow beamwidth.

17. The wireless communication system of claim 1, wherein the communication devices include an antenna array configured for a narrow receive beam.

18. A wireless communication system using asymmetric directivity signals, comprising:

a base station configured to transmit millimeter wave band low directivity downlink signals having a wide beamwidth in separate time slots in a shared frequency channel;

a plurality of communication devices configured to receive the millimeter wave band downlink signals in respective time slots in the shared frequency channel;

the plurality of communication devices configured to transmit millimeter wave band high directivity uplink signals having narrow beamwidth in different respective frequency channels, wherein the signals transmitted in the uplink direction by the communication devices are received by the base station using a wide receive beam, and wherein the signals transmitted in the downlink direction by the base station are received by the communication devices using a narrow receive beam.

19. The wireless communication system of claim 18, wherein the base station transmits a first low directivity signal in a first time slot.

20. The wireless communication system of claim 18, wherein the base station transmits a second low directivity signal in a second time slot and a third low directivity signal in a third time slot.

21. The wireless communication system of claim 18, wherein a first communication device transmits a first millimeter wave band high directivity signal on a first frequency channel.

22. The wireless communication system of claim 18, wherein a second communication device transmits a second millimeter wave band high directivity signal on a second frequency channel and a third communication device transmits a second millimeter wave band high directivity signal on a third frequency channel.

23. The wireless communication system of claim 18, wherein the communication device receives downlink signals and transmits uplink signals over the same channel.

24. The wireless communication system of claim 18, wherein the communication device receives downlink signals and transmits uplink signals over different channels.

25. A method of communication using asymmetric directivity signals, comprising:

transmitting, by a base station, millimeter wave band low directivity downlink signals having a wide beamwidth in separate time slots in a shared frequency channel;

receiving, by each of a plurality of communication devices, the millimeter wave band downlink signals in the separate respective time slots in the shared frequency channel; and transmitting by the communication devices millimeter wave band high directivity uplink signals having a narrow beamwidth in different respective frequency channels.

26. A method of communication using asymmetric directivity signals, comprising: receiving, by a plurality of communication devices, millimeter wave band low directivity downlink signals having a wide beamwidth in a shared frequency channel; and transmitting by the communication devices millimeter wave band high directivity uplink signals having a narrow beamwidth in different respective frequency channels, wherein the communication devices receive in separate respective time slots in the shared channel.

27. The method of claim 26, wherein a first communication device transmits in a first frequency channel and a second communication device transmits in a second frequency channel.

28. The method of claim 26, wherein transmission of the uplink signals in different respective frequency channels by the first and second communication devices overlap in time.

29. The method of claim 26, wherein transmission of the uplink signals in different respective frequency channels by the first and second communication devices are not in separate respective time slots.

30. A method of communication using asymmetric directivity signals, comprising:

receiving, by a plurality of communication devices, millimeter wave band low directivity downlink signals having a wide beamwidth in separate respective time slots in a shared frequency channel; and transmitting by the communication devices millimeter wave band high directivity uplink signals having a narrow beamwidth in different respective frequency channels.

31. The method of claim 30, wherein transmission of the uplink signals in different respective frequency channels by the first and second communication devices overlap in time.

32. The method of claim 31, wherein transmission of the uplink signals in different respective frequency channels by the first and second communication devices are not in separate respective time slots.

33. A method of communication using asymmetric directivity signals, comprising:

transmitting by a radio base station in separate time slots millimeter wave band low directivity downlink signals having a wide beamwidth;

receiving by the radio base station millimeter wave band uplink signals having high directivity and narrow beamwidth in different respective frequency channels.

34. The method of claim 33, wherein reception of the uplink signals by the radio base station in different respective frequency channels overlap in time.

35. The method of claim 33, wherein reception of the uplink signals by the radio base station in different respective frequency channels are not in separate respective time slots.

* * * * *